United States Patent [19]

Hutterer et al.

[11] Patent Number: 4,729,051

[45] Date of Patent: Mar. 1, 1988

[54] SELECTIVELY INHIBITED ACTUATING MECHANISM FOR A LATCHED PUSHBUTTON

[75] Inventors: Heribert Hutterer; Johann Veigl, both of Vienna, Austria

[73] Assignee: U.S. Philips Corporation, New York, N.Y.

[21] Appl. No.: 690,923

[22] Filed: Jan. 11, 1985

[30] Foreign Application Priority Data

Jan. 18, 1984 [AT] Austria .................................. 149/84

[51] Int. Cl.⁴ ...................... G11B 15/18; G11B 19/02; G11B 5/008; G05G 11/00
[52] U.S. Cl. ...................... 360/137; 360/60; 360/62; 360/71; 360/90; 360/96.3; 360/105; 74/483 PB; 200/323; 200/325
[58] Field of Search ...................... 360/60–62, 360/73, 74.1, 90, 93, 96.1, 96.3, 105, 137; 200/318, 323–325; 74/483 PD

[56] References Cited

U.S. PATENT DOCUMENTS

| | | | |
|---|---|---|---|
| 3,305,187 | 2/1967 | Atsumi | 360/96.3 X |
| 3,752,486 | 8/1973 | Nakamura | 360/62 X |
| 3,909,841 | 9/1975 | Holler et al. | 360/62 X |
| 4,000,515 | 12/1976 | Fukawa | 360/60 |
| 4,287,542 | 9/1981 | Okuda | 360/105 |

*Primary Examiner*—Stuart N. Hecker
*Assistant Examiner*—Benjamin E. Urcia
*Attorney, Agent, or Firm*—David R. Treacy

[57] ABSTRACT

An apparatus has a part which can be moved to an operating position by an actuating device, in response to movement of a button to an on position. Upon movement of the part to its operating position, a latching member directly associated with the part latches the button in its on position. Upon sensing a predetermined condition in the apparatus, a control member prevents the transmission of the actuating movement by the actuating device to the part, and a user becomes aware that the part has not moved to its operating position because the button does not become latched in its on position.

15 Claims, 11 Drawing Figures

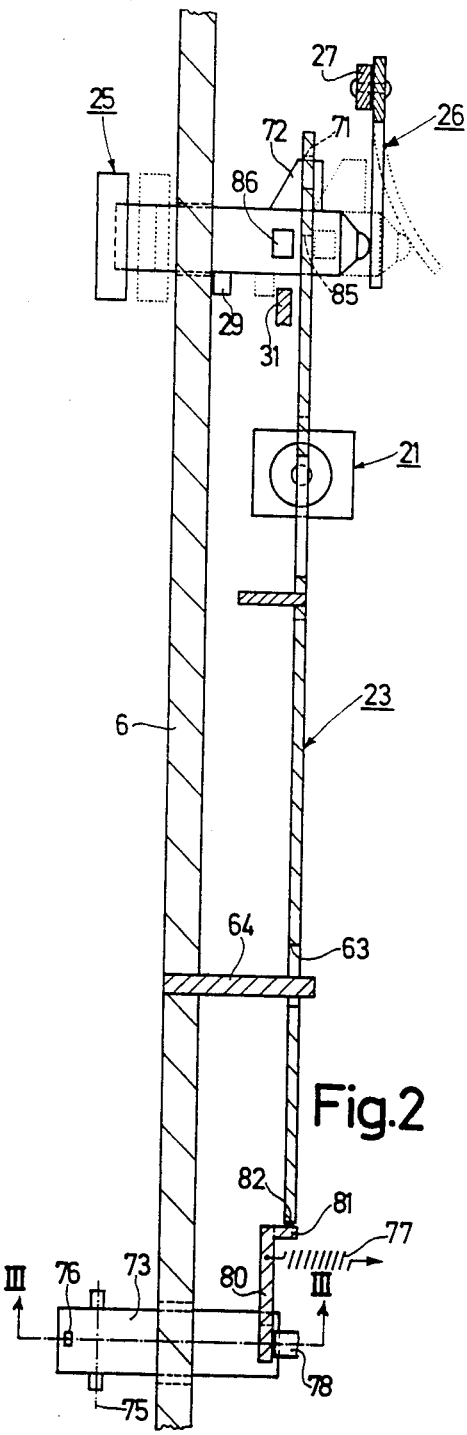
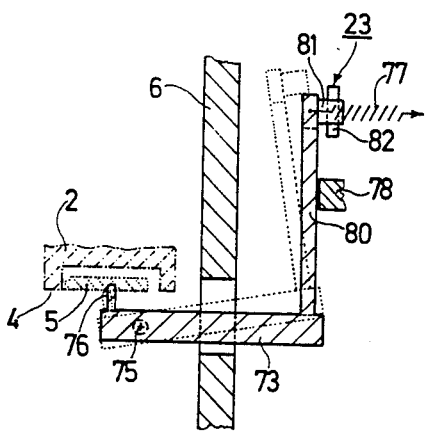
Fig.2
Fig.3

SELECTIVELY INHIBITED ACTUATING MECHANISM FOR A LATCHED PUSHBUTTON

BACKGROUND OF THE INVENTION

The invention relates to an apparatus, such as a recording and/or reproducing apparatus having a mechanism for actuating an apparatus part in response to movement of a latching button, and a control for inhibiting the actuation of the part; and more particularly to such an apparatus comprising at least one button which is movable from an off-position to an on-position against the force of a return spring for selecting a mode of operation in the apparatus, and at least one apparatus part which is movable from a rest position to an operating position by setting the button from its off-position to its on-position and which starts that mode of operation in its operating position. An actuating device transmits the button actuating movement to the apparatus part. A latching member for the button is movable between a release position, and a latching position and retains the button in its on-position against the force of the return spring when the member is in its latching position. At least one control member, which is movable between a release position and a blocking position in which that mode of operation can be started or is inhibited, respectively, in its blocking position inhibits the movement of the latching member to its latching position, and inhibits the transmission by the actuating device of the button actuating movement to the apparatus part, thereby inhibiting movement of that part into its operating position.

Such an apparatus is disclosed in, for example, German Auslegeschrift No. 26 58 603, to which U.S. Pat. No. 4,106,064 corresponds. In this known apparatus the control member is constructed as a slide which is intended for sensing a marker, such as a break-out tab, of a magnetic-tape cassette. The member or slide cooperates directly with the actuating device, constituted by a shift lever, for controlling the slide; and cooperates with the latching member for controlling the button. Thus, the control member performs two control functions which must be coordinated accurately with one another for a correct operation. This requires a rather intricate construction of the control member. Since the control member cooperates with and controls the actuating device it may happen that in the event of erroneous control, for example, due to wear, the apparatus part performs an undesired movement although the control member is in its blocking position. Such a malfunction is obviously undesirable. Since the control member cooperates with the latching member and enables this latching member to retain the button in its on-position, if a cassette marker is sensed and the control member is consequently in its release position, the apparatus part constituted by the magnetic-head support is set to its operating position via the shift lever when a button is actuated to select the mode of operation. The button is retained in its on-position by the latching member. The fact that the button is retained in its on-position then provides an indication to the user that the apparatus has been set to the mode of operation. However, due to defects or incorrect operation it may also happen that the apparatus part is not set to its operating position when the button is actuated; that is, the apparatus part remains in its rest position and the mode of operation is not started, although the latching member keeps the button in its off-position. If the button is then retained in its on-position the user will erroneously assume that the mode of operation has been started. It is obvious that this is also undesirable.

SUMMARY OF THE INVENTION

It is the object of the invention to preclude the above problems.

More particularly, an object of the invention is to enable an apparatus user to depress a control button normally, even when the desired apparatus part movement is inhibited, but to know the function is not being performed because the button does not latch.

A further object is to provide an apparatus in which the apparatus part cannot be set to its operating position when the control member is in its blocking position, and in which the button for selecting a mode is latched and kept in its on-position to signal that the mode has been started only if the apparatus part which starts said mode has actually moved from its rest position to its operating position.

In accordance with the invention, the control member engages the apparatus part, and the latching member is coupled to the apparatus part, the movement of the latching member to its latching position being controlled by the apparatus part as it moves to its operating position. Since the control member now cooperates directly with the apparatus part, a simple construction with a high reliability is obtained and the apparatus part cannot inadvertently move to its operating position when the control member is in its blocking position. Further, since the latching member is now controlled by the apparatus part itself, in such a way that the movement of the latching member to its latching position is controlled by the apparatus part as it is set to its operating position, the latching member can latch the button in its on-position only if the apparatus part is actually moved from its rest position to its operating position.

The fact that the button is latched in its on-position is now always a reliable indication to the user of the apparatus, because this is possible only if the mode of operation has actually been started. The instant at which the latching member, whose movement to the latching position is controlled by the apparatus part as this is set from its rest position to its operating position, reaches its latching position and consequently latches the button in its on-position may be selected arbitrarily within the time interval required for the movement of the apparatus part.

The apparatus part may be movable from its rest position to its operating position in one actuating direction only, in which case the apparatus part is set from its rest position to its operating position by the actuating device in this actuating direction. When the control member is in its release position, the blocking member is situated in the path of movement of the apparatus part when the control member is in its blocking position, so that the apparatus part cannot move to its operating position. However, in this configuration the control member must take up the actuating force exerted on the apparatus part by the actuating device. This actuating force causes the control member to be subjected to a comparatively high load.

It is advantageous if the apparatus part can be set from its rest position to an intermediate position in a first actuating direction, and then moved from its intermediate position to its operating position in a second actuating direction. In this embodiment a release device cooperates with the apparatus part; and when the button is set to its on-position, enables the apparatus part to be set from its rest position to its intermediate position in the first actuating direction under the influence of a force provided by an actuating spring which acts on the part, unless the movement of the apparatus part to its intermediate position is blocked by the control member.

When the apparatus part is blocked by the control member, the actuating device does not cooperate with the apparatus part. As a result, the actuating movement of the actuating device is not transmitted to the part. When the apparatus part is in its intermediate position the actuating device engages the part and transmits the actuating movement to the part, and thereby sets the part from its intermediate position to its operating position in the second actuating direction. This ensures that in its blocking position the control member, when it engages the apparatus part, must take up only the comparatively small force exerted by the actuating spring, so that the control member is subjected to only a small load. This permits high reliability and long life.

In order to enable the apparatus part to be moved from its rest position to its intermediate position in the first actuating direction, a separate release device may comprise, for example, a release lever which can be moved out of the path of movement of the apparatus part when the button is set to its on-position. In a simpler construction; it is advantageous if the release device comprises a first projection which projects from the button in a direction substantially opposite to the first actuating direction; and the apparatus part comprises an extension which extends substantially transversely to the first actuating direction and is adapted to cooperate with the first projection. In the off-position of the button, this extension is urged against the first projection under the influence of the actuating spring, the first projection being moved when the button is set to its on-position and thereby enabling the extension of the apparatus part to be moved from its rest position to its intermediate position in the first actuating direction under the influence of the actuating spring. This ensures that the button itself enables the apparatus part to be set from its rest position to its intermediate position, so that a simple construction and a reliable operation may be realized.

The latching member may be coupled to the apparatus part, for example, via a lever system. Alternatively, the coupling between the apparatus part and the latching member may be provided a guide-slot system. It is found to be very advantageous if the latching member is constituted by the extension of the apparatus part, which extension in the on-position of the button is situated behind the first projection of the button to keep the button in its on-position when the apparatus part has been set to its intermediate position. Since the latching member is integral with the apparatus part and the first projection is also used for locking the button in its on-position, a simple, highly stable and reliable construction is obtained. Since the extension of the apparatus part is situated behind the first projection of the button and is used as latching member, the button is already held in its on-position when the apparatus part is being moved from its rest position to its operating position in order to start the mode of operation. This has the advantage that the button is already locked briefly after its actuation, and the user immediately has an indication whether the selected mode has been started, although the entire process has not yet been completed but is in progress which practically guarantees that the mode has actually been started.

It is also advantageous if the latching member is constituted by a portion of the apparatus part and the button comprises a second projection which projects from the button in a direction opposite to the second actuating direction of the apparatus part. When the button is in its on-position and the apparatus part is in its operating position, in order to latch the button in its on-position, the second projection extends being that portion of the apparatus part which serves as a latching member. This also results in a simple stable and reliable construction. Since the portion of the apparatus part which serves as the latching member is situated behind the second projection of the button, the button is not latched in its on-position until the movement of the apparatus part from its rest position to its operating position to start the mode of operation has almost been completed. This provides the advantage that the button is not locked and consequently the user is not given an indication whether the selected mode has been started until the relevant cycle of operations has almost been completed. This timing practically ensures that the mode of operation has actually been started when locking occurs.

Three embodiments of the invention will be described in more detail, by way of example, with reference to the accompanying drawings.

BRIEF DESCRIPTION OF THE DRAWINGS

FIG. 2 is a sectional view of a part of the apparatus taken on the line II—II in FIG. 1, the "recording" button being shown in solid lines in its off-position and in broken lines in its on-position, FIG. 3 is a schematic sectional view taken on the line III—III in FIGS. 1 and 2, showing a control member in its blocking position, and in broken lines in its released position.

DESCRIPTION OF THE PREFERRED EMBODIMENTS

Drive and Button Mechanism

Figure 1:
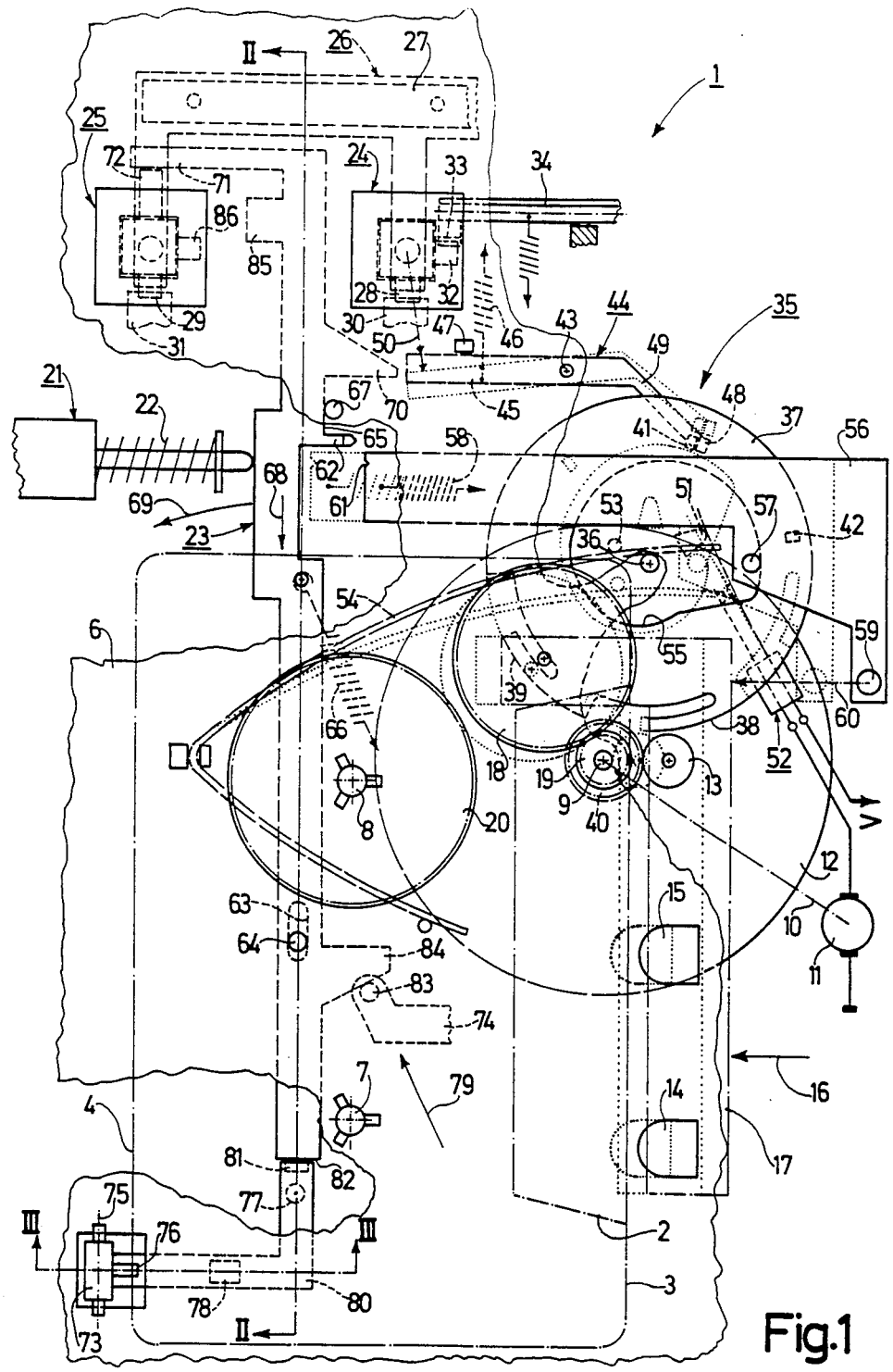
FIG. 1 is a schematic plan view of a first embodiment of the invention, in a compact cassette recorder in the rest position; the parts shown in broken lines are in their operating positions in the "playback" mode.
Figure 4:
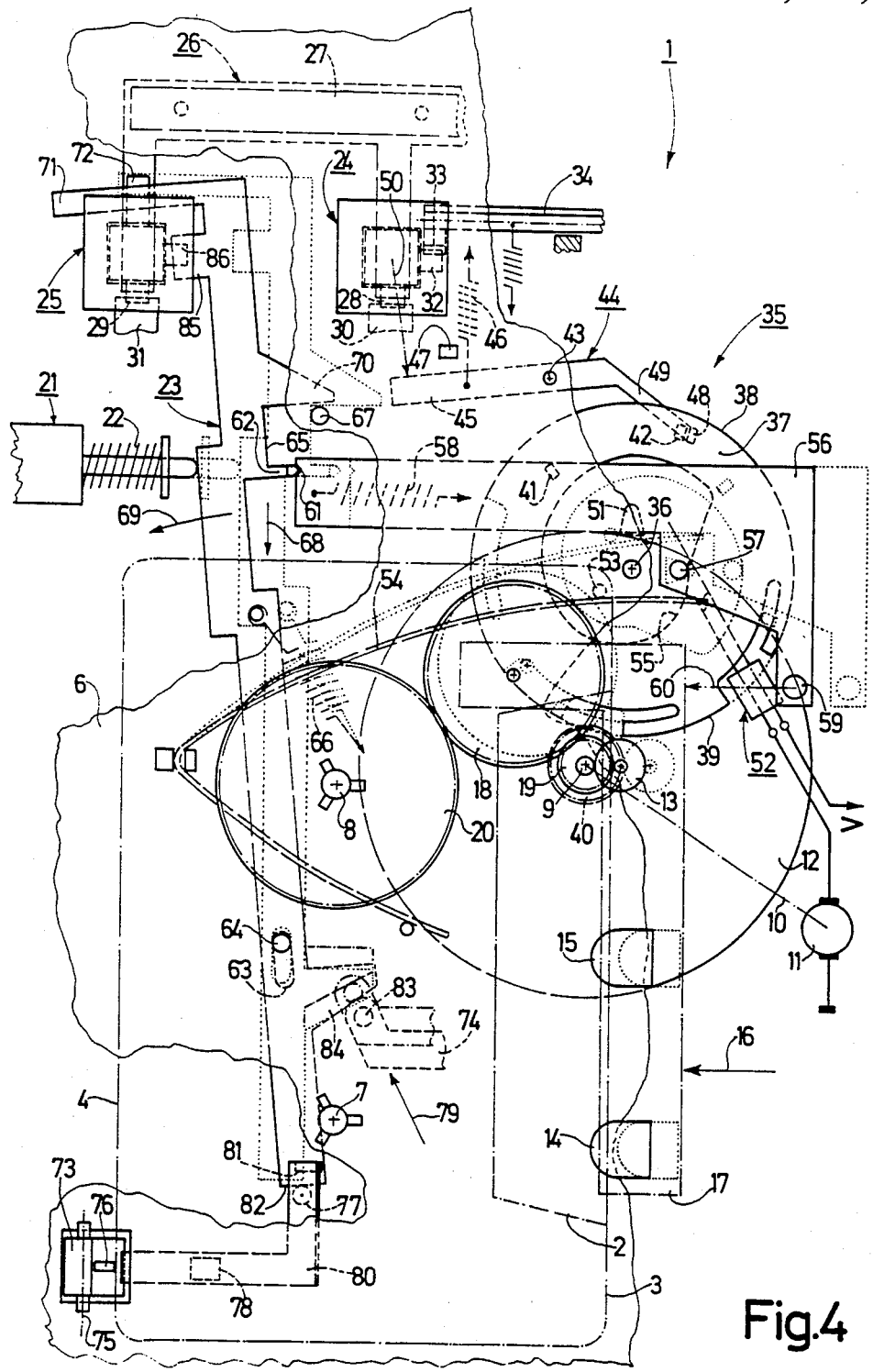
FIG. 4 shows the apparatus of FIG. 1, the apparatus parts shown in broken lines being in intermediate positions which they occupy briefly after selection of the "recording" mode and the parts being shown in solid lines being in their operating positions which they occupy when the "recording" mode has been started.

The magnetic-tape-cassette apparatus 1 shown in FIG. 1 is intended for use with a compact cassette 2 shown symbolically in dash-dot lines in FIGS. 1, 3 and 4. In the cassette the magnetic tape extends along a long narrow side 3 between two magnetic-tape reels arranged side by side. Near the ends of its other long narrow side 4 the magnetic-tape cassette 2 has a break-out tab 5 indicated by the broken lines in FIG. 3. When the tab 5 has been removed from the cassette the information signals recorded on the magnetic tape should not be erased; however, if the tabs 5 of the magnetic-tape cassette are still in place, the information signals recorded on the magnetic tape may be erased and a new recording may be made on this tape.

For driving the magnetic tape reels of the magnetic-tape cassette 2, the apparatus 1 comprises two winding spindles 7 and 8 which are mounted for rotation on a mounting plate 6 and which are engageable with the reels when the cassette is inserted into the apparatus. For rapidly winding the magnetic tape from one reel to the other in the "fast forward" and "fast reverse" mode each of the two windings spindles 7 and 8 can be driven with a higher speed by a generally known fast-wind mechanism, not shown.

In the "playback" and "recording" modes the magnetic tape is driven at a "normal forward" speed. A capstan 9 extends through and is rotatably journalled in the deck plate 6, and can be driven at a constant speed by a motor 11 via a transmission 10 such as a belt drive, schematically represented by a dash-dot line. To ensure uniform rotation the capstan 9 is rigidly connected to a coaxial flywheel 12 arranged underneath the mounting plate 6.

A pressure roller 13 for pressing tape against the capstan 9, a magnetic erase head 14, and a recording/-playback head 15 are arranged on a mounting plate 17 which for clarity is represented by dash-dot lines. The mounting plate is guided on the upper side of deck plate 6 so as to be movable in the direction indicated by the arrow 16, perpendicularly to the narrow side of the magnetic-tape cassette 2, from its rest position shown in broken lines in FIG. 1 to its operating position shown in dotted lines, under the influence of a return spring, not shown. The rest position and the operating position of the mounting plate 17 are defined by, for example, locating stops on the deck plate.

An idler gear 18, which is movable relative to the deck plate 6, is coupled to the mounting plate 17 and is constantly in mesh with a first pinion 19 which is rigidly mounted on the capstan 9. The idler 18 can be brought into mesh with a gear 20 which is coaxial with the winding spindle 8 by moving the mounting plate 17 in the direction indicated by the arrow 16, so that the gear 20 can drive the winding spindle 8 via a slipping clutch, not shown, when the magnetic tape is driven in the "normal forward" mode. The pinion 29, the idler 18 and the gear 20 are situated in one plane above the deck plate 6. In order to drive the magnetic tape in the "normal forward" mode the mounting plate 17 is set to its operating position, in which the pressure roller 13 presses the magnetic tape against the capstan 9 which is driven by the motor 11, the idler 18 couples the first pinion 19 on the capstan 9 to the gear 20 for driving the winding spindle 8, and the magnetic heads 14 and 15 are in contact with the magnetic tape to scan this tape.

In order to start the "playback" mode the mounting plate 17 should be moved from its rest position to its operating position in the direction indicated by the arrow 16, so that the pressure roller 13, the idler 18 and two magnetic heads 14 and 15 assume their operating positions. Thus, the mounting plate 17 constitutes an apparatus part which is movable from a rest position to an operating position and which starts the "playback" mode in its operating position. In addition to the movement of the mounting plate 17 from its rest position to its operating position, recording/playback switch 21 then assumes its rest position, as shown in FIG. 1, in which no erase signal is applied to the magnetic erase head 14, and the recording/playback head 15 is connected to the electrical playback circuit of the apparatus.

In order to start the "recording" mode it is necessary to set the recording/playback switch 21 to its operating position, shown in FIG. 4, against the force on a return spring 22 in the form of a compression spring. In this recording position the switch 21 causes an erase signal to be applied to the magnetic erase head 14, and the magnetic recording/playback head 15 to be connected to the electrical recording circuit of the apparatus. It should be noted that when the recording/playback switch 21 returns to its rest position, in which the mounting plate 17 remains in its operating position, the apparatus is automatically switched from the "recording" mode to the "playback" mode.

For actuating the recording/playback switch 21, the apparatus 1 comprises a shift lever 23 which can be set from a rest position to an operating position, the free end of the switching rod of the recording/playback switch 21 being urged against this lever under the influence of the return spring 22. When the shift lever 23, whose construction and operation will be described in more detail hereinafter, is moved to its operating position shown in FIG. 4, it sets the recording/playback switch 21 to its operating position. Thus, the shift lever 23 constitutes an apparatus part which is movable from a rest position to an operating position, and which starts the "recording" mode in its operating position.

For selecting the modes of operation of the apparatus, the recorder has a number of push-buttons. Two push-buttons 24 and 25, for selecting the "playback" and "recording" modes, are shown in FIGS. 1 and 4. For selecting the "playback" mode the push-button 24 must be actuated. For selecting the "recording" mode the push-button 25 must be actuated simultaneously with the push-button 24; if only the push-button 25 for the "recording" mode is actuated, this will have no effect. As can be seen in FIG. 2, the push-buttons 24 and 25 are each mounted on a respective push-button rod which is guided in the deck plate 6 in a direction perpendicular to the plate, so as to be movable between an on-position and an off-position against the force exerted by a return spring 26. The return spring 26 is a multi-arm blade spring whose major portion is secured to an intermediate support 27. The rounded free end of each arm cooperates with the respective push-button 24 and 25. The off-position of each push-button 24 and 25 is defined by a projection 28 and 29, respectively, which is urged against the underside of the deck plate 6 under the influence of the return spring 26. The on-position of each of the push-buttons 24 and 25 is defined in principle, by abutment of the projection, 28 and 29 respectively, with a stop, 30 and 31 respectively, on the apparatus. To keep the push-button 24 in its on-position, the button comprises a latching projection 32 which in the on-position of the push-button can be retained by a latching nose 33 of a spring-loaded pivotable latching member 34. Two further latching noses, not shown, of the latching member 34 cooperate with push-buttons, not shown, for selecting the "fast-forward" and "fast reverse" modes to retain these buttons in their operating positions. A push-button for the "STOP" mode, can be set to such a position, that the latching projections of the push-buttons cooperating with them are released, after which the released push-buttons are returned to their off-positions by the force exerted by the associated spring arms of the return spring 26.

The Actuating Device

The apparatus comprises an actuating device, formed by a motor-driven servomechanism 35, which can be rendered operative by actuating the push-button 24 and which provides the actuating forces for moving the mounting plate 17 and the shift lever 23. The use of such a servo-mechanism enables the actuating forces for the push-button 24 to be minimized, so that actuation of the push-buttons proceeds very simply and smoothly. The servo-mechanism 50 comprises a servo disc 37 which is arranged beneath the deck plate 6, as is shown in FIGS. 1 and 4, and which is mounted on a spindle 36 for rotation on the deck plate. The circumference of the disc 37 is provided with a long first toothed portion 38 and a short second toothed portion 39, and two equally long non-toothed portions separating the two toothed portions 38 and 39 from each other. For driving the servo disc 37 a second pinion 40 is rigidly connected to the capstan 9 beneath the deck plate 6, so that this pinion together with the capstan 9 can be driven by the motor 11 of the apparatus via the transmission 10.

In this example the servo disc 37 can be stopped in two positions in which the second pinion 40 faces a non-toothed portion, namely in a rest position shown in solid lines in FIG. 1 and in an operating position shown in broken lines in FIG. 1 and in solid lines in FIG. 4. For this purpose the lower radial surface of the servo disc 37, which is remote from the deck plate 6, carries an axially projecting first latching stop 41 and an axially projecting second latching stop 42 which is situated at a larger radial distance from the center of the servo disc than the first latching stop 41.

In order to cooperate with the two latching stops 41 and 42 a two-arm latching lever 44 is arranged beneath the deck plate, to be pivotable about a spindle 43 mounted in the deck plate 6, and is movable between a first and a second latching position. A spring 46 acts on a first arm 45 of the latching lever 44 and urges the latching lever 44 into its first latching position, shown in solid lines in FIG. 1, which is defined by a stop 47 on the deck plate 6. In this first position the free end 48 of the second arm 49 of the latching lever 44, which end is bent up towards the deck plate, can cooperate with the first latching stop 41. By actuating the push-button 24 the latching lever 44 is movable to its second latching position, shown in broken lines in FIG. 1 and in solid lines in FIG. 4, against the force of the spring 46 via an coupling 50 which is represented symbolically by a dash-dot line. The latching lever is kept in this second latching position by the actuated and latched push-button 24 via the coupling 50 and can cooperate with the second latching stop 42. The coupling 50 may be, for example, a lever mechanism which can be actuated by the push-button 24. Alternatively, the coupling 50 may be simply an actuating projection which projects laterally from the push-button 24 and which cooperates with the latching lever 44 via an actuating surface which is inclined relative to this lever.

On its lower radial surface which is remote from the deck plate 6, the servo disc 37 carries an axially projecting switching cam 51. The switching cam is adapted to engage an electrical switch 52, shown schematically. In the rest position of the servo disc 52, shown in solid lines in FIG. 1, the switch is kept open by the switching cam 51 and thereby interrupts the supply voltage V to the motor 11. The switch 52 is released by the switching cam 51 and is consequently closed in all the other positions of the servo disc 37, thereby applying the supply voltage V to the motor 11.

On its lower radial surface which is remote from the deck plate 6 the servo disc 37 also carries an axially projecting pin 53 which cooperates with a wire spring 54 which acts against abutments on the deck plate 6 and which performs several functions. The spring 54 retains the servo disc 37 in its rest position via the pin 53, urging the first latching stop 41 against the angular free end portion 48 of the latching lever 44 which is in its first latching position. After the latching lever 44 has been pivoted into its second latching position via the transmission 50, upon actuation of the push-button 24, in which position the angular end portion 48 of the latching lever 44 is disengaged from the first latching stop 41, the wire spring 54 imparts a mechanical impulse to the servo disc 37 via the pin 53. In this way the servo disc is rotated clockwise upon actuation of a button, so that the long toothed portion 38 meshes with the second pinion 40 on the capstan 9.

The spring 54 engage the pin 53 to cause the servo disc 37 to move to and to be retained in the operating position, shown in broken lines in FIG. 1 and in solid line in FIG. 4, when the pinion 40 has become disengaged from the long toothed portion 38, and thus causes the second latching stop 42 to be urged against the angular free end portion 48 of the latching lever 44 which is then in its second latching position. Finally, when the latching lever 44 has been moved from its second latching position, the wire spring 54 acting on the pin 53 causes the servo disc 37 to rotate out of its operating position to its first latching position, which happens when the actuated and latched push-button is set to its off position, so that the short toothed portion 39 meshes with the second pinion 40, thereby causing the servo disc 37 to be rotated into its rest position. If the second pinion 40 is disengaged from the short toothed portion 39 shortly before the servo disc 37 reaches the rest position, the wire spring 54 causes the servo disc to rotate further via the pin 53 until it reaches its rest position in which it is retained by the wire spring 54, as stated above.

The upper radial surface of the servo disc 37 which faces the deck plate 6 is formed with a recess whose circumferential bounding wall 55 has such a shape that its radial distance from the center of the servo disc varies. Thus, the bounding wall 55 constitutes an eccentric drive means for the servo mechanism 35. This wall drives an actuating slide 56 of the servo mechanism 35, mounted on the deck plate 6, in a manner not shown, so as to be movable in the direction indicated by the arrow 16. For this purpose the actuating slide 56 carries a pin 57 which engages the recess of the servo disc 37 and is urged against the bounding wall 55 of the recess by the force exerted by the spring 58 which acts on the actuating slide 56, urging this slide in a direction opposite to that indicated by the arrow 16, so that the position of the actuating slide 56 is always defined by the position of the servo disc 37. It is obvious that the eccentric drive may also be constituted by an endless groove formed in a radial surface of the servo disc, the pin on the actuating slide engaging said groove with a slight clearance, in which case the spring which acts on the actuating slide may be dispensed with.

On its angular free end the actuating slide 56 of the servo mechanism 35 carries an actuating pin 59 which cooperates with the mounting plate 17 via a coupling 60, symbolically represented by dash-dot lines, to move the plate from its rest position to its operating position against the force of the return spring (not shown) acting on the plate. The coupling 60 may be constituted by, for example, a lever mechanism; alternatively, it may be a limb of a wire spring having two limbs which acts against the mounting plate, the other limb cooperating with the actuating pin 51. On its other free end the actuating slide 56 has an actuating groove 61 which, under certain conditions, engages an angular actuating projection 62 on the shift lever 23 to move this lever to its operating position.

The shift lever 23 has a slot 63 through which a first guide pin 64 arranged on the deck plate 6 extends, and an edge 65 which is urged against a second guide pin 67 under the influence of a spring 66. Thus, the shift lever 23 with the two guide pins 64 and 67 can be shifted in a first actuating direction, indicated by the arrow 68, from a rest position shown in FIG. 1 to an intermediate position, shown in dotted lines in FIG. 1, and in a second actuating direction, indicated by the arrow 69, from the intermediate position shown in dotted lines in FIG. 4 to the operating position shown in solid lines in FIG. 4, the first guide pin 64 constituting the pivot for the shift lever 23. The intermediate position of the shift lever is defined by a lateral projection 70 on this lever, which is urged against the second guide pin 67 by the spring 66 when the lever is intermediate position. It is obvious that the operating position is defined by the actuating slide 56 which in its operating position acts on the actuating portion 62 of the shift lever 23.

Consequently, the spring 66 tends to move the shift lever 23 in the first actuating direction 68. On its end which is situated near the push-buttons 24 and 25 the shift lever 23 comprises an extension 71 which extends transversely to the first actuating direction 68 and which engages a first projection 72 projecting from the push-button 25 in a direction opposite to the first actuating direction 68 of the shift lever 23. As is apparent from FIGS. 1 and 2, when the push-button 25 is in its off-position the extension 71 is urged against the projection 72 on this push-button under the influence of the spring 66, thereby defining the rest position of the shift-lever 23 and inhibiting a movement of the shift lever in the first direction 68 under the influence of the spring 66. When the push-button 25 is set to its on-position, as shown in dotted lines in FIG. 2, the first projection 72 on this button is also moved, so that the extension 71 of the shift lever 23 can be moved by the spring 66 in the first direction 68 from its rest position to is intermediate position. The first projection 72 on the push-button 25 thus constitutes a release device which co-operates with the shift lever 23, and which enables the shift lever to move in the first direction 68 from its rest position to its intermediate position under the influence of the associated spring 66 when the button 25 is set to its on-position. By constructing the release device for the shift lever 23 as a projection on the push-button 25 a particularly simple and reliable operation is obtained.

The shift lever 23 cooperates with two control members 73 and 74 which can each be moved between a release position and a blocking position to enable or inhibit the "recording" mode. In a manner, not shown, the first control member 73 is pivotable about a spindle 75 and comprises a sensor pin 76 for mechanically detecting the presence of a break-out tab 5 for a magnetic-tape cassette 2 which has been inserted in the apparatus, as can be seen in FIG. 3. When a cassette provided with a break-out tab 5 is inserted, that is if the recorded information signals are to be erased and new information signals are to be recorded by selecting the "recording" mode, the tab 5 pivots the control member 73 into the release position, shown in dotted lines in FIG. 3, by pushing the sensor pin 76 against the force of the associated spring 77. The member remains in this position until the cassette is removed. When a cassette whose tab 5 has been broken out is inserted, that is, when erasing of the recorded information signals and recording new information signals by selection of the "recording" mode is not allowed, the control member 73 is not actuated and the spring 77 retains this member in its blocking position defined by a stop 78.

The second control member 74, which is shown only partly, cooperates with the fast-wind mechanism which, depending on its function, controls the movement of the second control membr 74 between a release position and a blocking position in the direction indicated by the arrow 79. If the fast-wind mechanism cooperates with one of the two winding spindles 7 or 8 for rapidly winding the magnetic tape and the information signals recorded on the magnetic tape should not be erased, it sets the second control member 74 to its blocking position shown in FIG. 1 and shown in dash-dot lines in FIG. 4. If the fast-wind mechanism does not cooperate with any of the winding spindles it sets the second control member 74 to its release position shown in broken lines in FIG. 4.

An L-shaped arm 80 of the first control member 73 carries a blocking projection 81 which cooperates with a free end 82 of the shift lever 23. The second control member 74 comprises a blocking pin 83 which cooperates with a laterally extending tab 84 of the shift lever. If the two control members 73 and 74 are in their blocking positions, as shown in FIG. 1, each control member 73, 74, respectively, inhibits a movement of the shift lever 23 in the first actuating direction 68 from its rest position shown in FIG. 1 to its intermediate position under the influence of the spring 66. The first control member 73 inhibits this movement by means of the blocking projection 81 which is situated in the path of movement of the free end 82 of the shift lever 23 when the control member is in its blocking position. The second blocking member 74 inhibits this movement by means of the blocking pin 83 which is situated in the path of movement of the tab 84 of the shift lever when the control member is in its blocking position.

It is obvious that the movement of the shift lever 23 in the first actuating projection 68 is also blocked if only one of the two control members 73 or 74 is in its blocking position and the other control member is in its release position. However, if both the above control members 73 and 74 are in their release positions the shift lever 23 can move to its intermediate position under the influence of the the spring 66. Since both control members 73 and 74 cooperate directly with the shift lever 23, this guarantees that the shift lever is always blocked when the two control members are in their blocking positions, thereby precluding an inadvertent movement of the shift lever to its operating position. Each of the two control members then cooperates with the shift lever only and performs no further function. This arrangement leads to a simple and reliable operation. When the control member 73 or 74 is in its blocking position it is only subject to the force exerted by the spring 66, so that the load to which each of the two control members is subjected in is blocking position is small. The small loading minimizes wear and prolongs life.

When the shift lever 23 is blocked in its rest position by at least one of the two control members 73 or 74, the actuating projection 62 of the shift lever 23 is situated outside the path of movement of that free end of the actuating slide 56 which includes the actuating groove 61. When the actuating slide 56 is moved from its rest position, shown in solid lines in FIG. 1, to its operating position, shown in dotted lines in FIG. 1, the actuating slide 56 of the servo mechanism 35 remains disengaged from the shift lever 23. Thus, the servo mechanism 35 cannot transmit an actuating movement to the shift lever 23 to set this lever to its operating position, if at least one of the two control members is in its blocking position.

When the shift lever is released by two control members 73 and 74 and is in its intermediate position shown in dotted lines in FIG. 4, the actuating projection 62 of the shift lever 23 is situated in the path of movement of the free end of the actuating slide 56 with the groove 61. When the actuating slide 56 is then moved from its rest position shown in dotted lines in FIG. 4 to its operating position shown in dotted lines in FIG. 4, the shift lever 23 can be moved in the second actuating direction 69 from its intermediate position shown in dotted lines in FIG. 4 to its operating position shown in solid lines in FIG. 4, by engagement of the end portion of the actuating projection 62 in the actuating groove 61, and pivoting of the shift lever 23 in the second actuating direction 69 about the first guide pin 64.

At its end which is situated near the buttons 24 and 25 the shift lever 23 comprises an integral latching projection 85, which serves as a latching member for retaining the push-button 25 in its on-position. During movement of the shift lever from its rest position shown in FIG. 1 to its operating position shown in solid lines in FIG. 4, the latching projection 85 is set from a release position shown in FIG. 1 to a latching position shown in solid lines in FIG. 4. If the shift lever 23 cannot be set to its operating position because at least one of the control members 73 and 74 is in its blocking position, this control member also inhibits the movement of the latching projection 85 to its latching position. However, if the shift lever 23 is free to move to its operating position, the latching projection 85 can also move to its latching position, so that it retains the push-button 25 in its on-position, to which it has been set previously against the force of the return spring 26.

For the cooperation with the latching projection 85 of the shift lever 23 the push-button 25 comprises a second projection 86 which extends substantially in a direction opposite to the second actuating direction 69 of the shift lever. As shown in FIG. 4, the projection 86 is situated behind the latching projection 85 of the shift lever when the push-button 25 is in its on-position shown in dotted lines in FIG. 2, and when the shift lever is in its operating position, to latch the push-button 25 in its on-position. As the latching projection 85 is integral with the shift lever 23 the latching projection only occupies its latching position, when the shift lever is actually in its operating position: that is, when the "recording" mode to be started by means of the shift lever has actually been started. If the push-button 25 is latched in its on-position after its actuation, this constitutes an indication to the user of the apparatus that the "recording" mode has been started. Since the latching projection and the shift lever are integral with each other a particularly simple, stable and reliable construction is obtained.

Operation—Recording

The operation of the apparatus when the "recording" mode is selected will now be described briefly. In order to start the "recording" mode two push-buttons 24 and 25 are actuated by the user of the apparatus and are set from their off-positions to their on-positions, in which the push button 25 is latched immediately by the latching member 34. Via the coupling 50 the playback button 24 sets the latching lever 44 from its first latching position shown in solid lines in FIG. 1 to its second latching position shown in dotted lines in FIGS. 1 and 4. The angular end portion 48 of the latching lever 44 is then disengaged from the first latching stop 41, so that the servo disc 37 is rotated by movement of the wire spring 54 pressing against the pin 53. The switching cam 51 then releases the switch 52, so that the switch is closed and consequently the supply voltage V is applied to the motor 11. As a result the motor drives the drive shaft 9 and hence the first pinion 19, through the transmission 10, also drives the second pinion 40. The force exerted by the wire spring 54 causes the long toothed portion 38 of the servo disc 37 to mesh with the second pinion 40 which is already driven, so that the servo disc is now driven to its operating position shown in dotted lines in FIG. 1 and in solid lines in FIG. 4. During this rotation the bounding wall 55 of the recess in the upper radial surface of the servo disc 37 moves the pin 57 on the actuating slide 56, so that the actuating slide 56 is moved in the direction indicated by the arrow 16 against the force of the spring 58. The resulting movement of the actuating pin 50 and the coupling 60 shifts the mounting plate 17 into its operating position in which the magnetic heads 14 and 15 cooperate with the magnetic tape, the pressure roller 13 presses the magnetic tape against the capstan 9 which is now driven, and the idler 18 couples the first pinion 19 to the gear 20 which is coaxial with the winding spindle 8.

As a result of the actuation of the recording push-button 25 the first projection 72 of this button is moved clear of the extension 71 of the shift lever 23, to enable this lever to be moved by means of the spring 66. However, if now at least one of the two control members 73 or 74 is in its blocking position shown in FIG. 1, the shift lever 23 cannot be moved from its rest position to its intermediate position, so the lever 23 remains in its rest position. The end portion of the servo mechanism 35 having the actuating groove 61 is moved by the actuating slide 56 but remains disengaged from the actuating projection 62 of the shift lever 23, so that the shift lever remains in its rest position and hence the recording/playback switch 21 is not set to its operating position to start the recording function. Thus, the servo mechanism 35 has only moved the head-mounting plate 17 to its operating position, as result of which the apparatus is set to the "playback" mode. In this mode the information signals recorded on the magnetic tape of a magnetic tape cassette inserted into the apparatus are reproduced, so that the use of the apparatus, although he wishes to start the "recording" mode, is warned by the reproduction of the information signals that instead of the "recording" mode the "play-back" mode is started. However, if the magnetic tape does not contain any information signals, the user is not given such a warning but he receives another indication when he releases the push-button 25. When the "recording" mode has not actually been started, and this button is released, it will return to its initial position under the influence of the associated return spring. This button movement is an indication to the user of the apparatus that the "recording" mode he wished to select has not been started.

However, if the two control members 73 and 74 are in their release positions as shown in FIG. 4, they also enable the shift lever 23 to be moved to its intermediate position after the button projection 72 clears the lever extension 71. The actuating spring 66 then pulls the shift lever 23 into its intermediate position before the servo mechanism 35 moves its actuating slide 56 out of its rest position, because of the shape of the bounding wall 55 of the recess in the servo disc. In this intermediate position, shown in dotted lines in FIG. 4, the servo disc has been rotated through approximately thirty degrees relative to its rest position in a clockwise direction and does not yet cause the actuating slide to be moved. As the servo disc is rotated further, the actuating slide 56 is moved in the direction indicated by the arrow 16 against the force exerted by the spring 58, and the actuating groove 61 is engaged by the actuating projection 62 to cause the shift lever 23 to be pivoted in the second actuating direction 69 about the guide pin 64 into its operating position. During this pivotal movement the shift lever 23 moves the switching member of the recording/playback switch 21 against the force of the return spring 22 of this switch, so that the recording/playback switch 21 is set to its operating position in which it initiates the switching operations required for the "recording" mode. During this movement of the shift lever to its operating position a latching projection 85 which is integral with this lever is set to its latching position in which, as shown in FIG. 4, it is situated behind the second projection 86 of the push-button 25 and thereby latches the recording push-button in its on-position. If the user of the apparatus now releases the button 25 this button remains in its on-position, so that the user of the apparatus had an indication that the "recording" mode has been started. This indication is obtained only when the shift lever is actually in its operating position, i.e., when it is guaranteed that the "recording" mode has actually been started.

It is to be noted that when, after actuation, the button 25 is released by the user before the shift lever 23 has been set to its operating position by the servo mechanism 35, the shift lever with its extension 71 is withdrawn from its intermediate position to its rest position by the first projection 72 of the push-button 25 against the force of the return spring 66. This occurs because the button 25 is returned to its off-position under the influence of the return spring 26; and the bounding wall of the projection 72, which is inclined relative to the shift lever, engages and moved the extension 71.

Further, it is to be noted that in case that the apparatus has previously been set to the "recording" mode so that the shift lever 23 is in its operating position, and the control member 74 which is controlled by the fast-wind mechanism is then set from its release position shown in dashed lines in FIG. 4 to its blocking position shown in dash-dot lines in FIG. 4, the shift lever 23 is moved against the force of the return spring 66 by the control member 74, so that the actuating projection 62 is pushed out of the actuating groove 61 and the shift lever is reset to its rest position. The latching projection 85 then releases the second projection 86 of the push-button 25 and the push-button returns to its off-position, so that as already stated the apparatus is set automatically from the "recording" mode to the "playback" mode.

Operation—STOP

In order to switch off the "recording" mode the user of the apparatus actuates, for example, the "STOP" button, which causes the latching member 34 to be positioned so that the latching nose 33 liberates the latching projection 32, after which the button 24 is set to its off-position by the return spring 26. The coupling 50 from the button 24 causes the latching lever 44 to move to its first latching position under the influence of the spring 46. In this position the lever 44 angular end portion 48 releases the second latching stop 42 and is situated in the path of movement of the first latching stop 41 of the servo disc 37. After the release of the second latching stop 42 the servo disc 37 is rotated by the wire spring 54 pressing against the pin 53, causing the short toothed portion 39 to mesh with the second pinion 40 in order to drive the servo disc. As a result of this, the servo disc 37 is rotated into its rest position which is defined by cooperation of the first latching stop 41 with the angular end portion 48 of the latching lever 44. The disc 37 reaches this position due to rotation caused by pressure of the wire spring 54 on the pin 53, after the short toothed portion 39 has become disengaged from the second pinion and the switching cam 51 opens the switch 52. The motor 11 is switched off and consequently the capstan 9 and the pinions 19 and 40 mounted on this capstan are no longer driven.

During the rotation of the servo disc 37 into its rest position the actuating slide 56 is moved out of its rest position under the influence of the spring 58. Via the coupling 60, movement of the actuating pin 59 enables the mounting plate 17 to be moved to its rest position in a direction opposite to that indicated by the arrow 16, so that the mounting plate 17 returns to its rest position under the influence of its return spring. Further, the actuating groove 61 releases the actuating projection 62, so that the shift lever 23 is initially pivoted into its intermediate position mainly under the influence of the return spring 22 of the recording/playback switch 21, in which position the latching projection 85 has been moved out of the path of movement of the second projection 86 of the button 25. Subsequently, the button 25 returns to its off-position under the influence of the return spring 26, thereby causing the shift lever 23 to return to its rest position due to movement of the inclined surface of its first projection 72 and the extension 71 of the shift lever 23. The return spring 22 of the recording/playback switch 21, which is released by the shift lever, of course resets the switch 21 to its rest position. Thus, all the apparatus parts are again in their rest positions, so that the previously started "recording" mode is switched off again.

In the embodiment described above the "recording" mode is selected by actuating two push-buttons in the apparatus. Obviously, it is also possible to start the "recording" mode by means of only one push-button which also actuates the servomechanism through a coupling device. The recording/playback switch need not be actuated directly by the shift lever, but this actuation may also be effected by the shift lever via an intermediate lever for stroke adaptation. It is evident that for positioning the head-mounting plate and the shift lever a servomechanism other than that described above may be used.

Fast-Erase Embodiment

Figure 5:
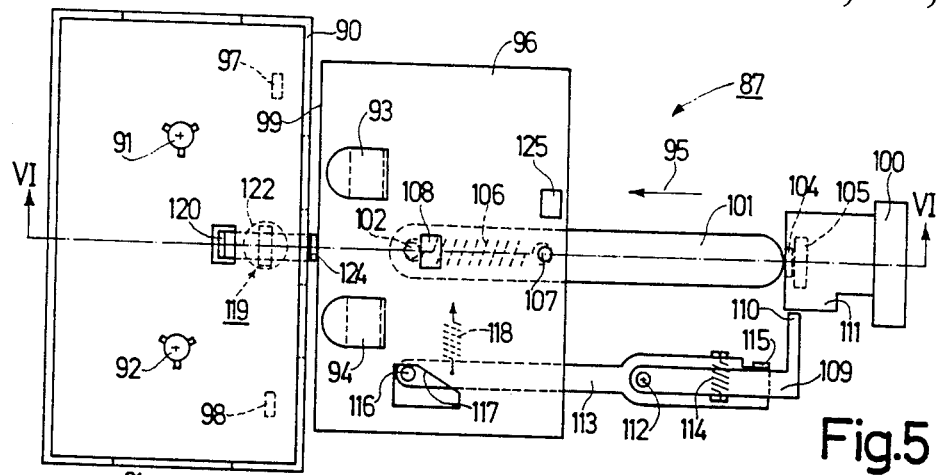
FIG. 5 is a schematic plan view of a second embodiment of the invention in a dictation transcriber which has a "fast erase" mode for erasing the dictation signals, the parts being shown in their rest positions in which the apparatus has not been set to any mode.
Figure 6:
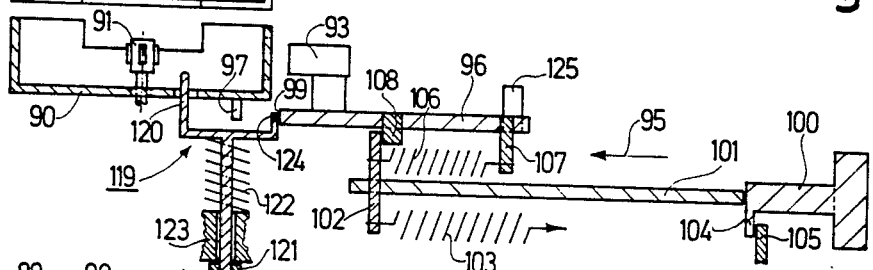
FIG. 6 is a sectional view taken on the line IV—IV of a part of the apparatus of FIG. 5, a control member being shown in its blocking position.
Figure 7:
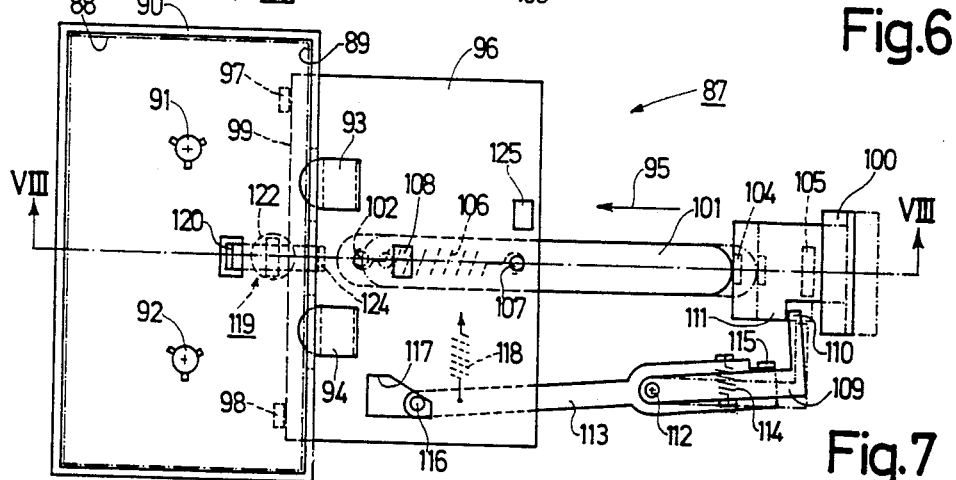
FIG. 7 is a view similar to FIG. 5, except that apparatus parts are in their operating positions in the "fast erase" mode.
Figure 8:
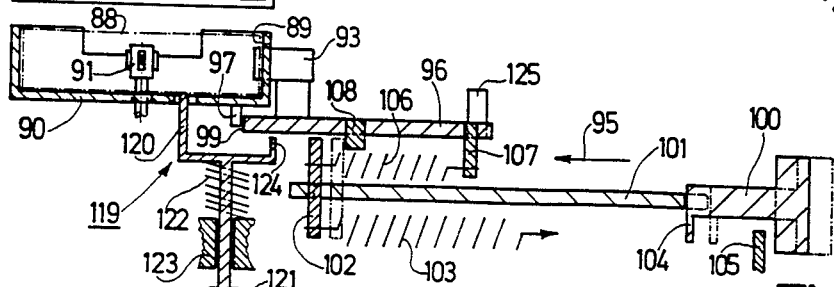
FIG. 8 is a sectional view of the FIG. 7 apparatus taken on the line VIII—VIII, the control member being shown in its release position.

The magnetic-tape-cassette apparatus 87 as shown in FIGS. 5 to 8 is intended for use with a magnetic-tape cassette 88, shown schematically in dash-dot lines in FIGS. 7 and 8. The cassette has two magnetic-tape reels arranged side by side between which the magnetic tape extends along a long narrow side 89. The apparatus comprises a cassette holder 90 for receiving such a magnetic-tape cassette 88.

In the apparatus 87 a "play back" mode can be started to reproduce dictation signals recorded on the magnetic tape in the cassette 88, so that the dictation signals can be transcribed by a typist. The dictation signals can be erased in a "fast erase" mode. In the present apparatus the magnetic tape can be driven by two winding spindles 91 and 92 both in the "play back" mode and in the "fast erase" mode, the winding spindle 91 being driven with a predetermined speed in the "playback" mode and the winding spindle 92 being driven with a higher speed in the "fast erase" mode. For the sake of simplicity the drive mechanisms for the two winding spindles are not shown in FIGS. 5 to 8 because they are not relevant to the present invention.

In order to reproduce the dictation signals in the "playback" mode the apparatus 87 comprises a magnetic playback head 93. For erasing the dictation signals in the "fast erase" mode the apparatus comprises a magnetic erase head 94. The two magnetic heads 93 and 94 are arranged on a head-mounting plate 96 which is movable, in a manner not shown, in the direction indicated by an arrow 95, between the rest position shown in FIGS. 5 and 6 and the operating position shown in FIGS. 7 and 8. The operating position of the head-mounting plate 96 is defined by two locating stops 97 and 98 which project from the bottom of the cassette holder and against which the head-mounting plate 97 abuts with the edge 99 which faces the cassette.

For switching on the "play back" mode the apparatus 87 comprises a button, not shown, which can be set to an off-position and an on-position; which can be locked in its on-position by means of a disengageable latching device; and which when actuated causes the head-mounting plate 96 to be moved to its operating position in the direction indicated by the arrow 95, and at the same time causes the winding spindle 91 to be driven by the relevant drive means. For starting the "fast erase" mode the apparatus comprises a slide button 100 which is slidable in a manner, not shown, in the direction indicated by the arrow 95 between an off-position, shown in FIGS. 5 and 6, and an on-position, shown in FIGS. 7 and 8. The free end of the actuating rod of the slide button 100 cooperates with a slide 101 which is slidable in the direction indicated by the arrow 95 and whose end which is remote from the slide button 100 carries a pin 102 which extends through the slide. A tension spring 103, which serves as return spring for the slide button 100 and which acts in the direction indicated by the arrow 95, is attached to the lower end of the pin 102 and urges the slide 101 toward the slide button 100.

When the slide button 100 is not actuated, the tension spring 103, acting through the pin 102 and slide 101, urges a lateral projection 104 of the actuating rod of the slide button 100 against the stop 105 in the apparatus, thereby defining the off-position of the slide button 100 in the rest position of the slide 101.

A further tension spring 106 is attached to the upper end of the pin 102 which extends through the slide 101, the other end of the spring 106 being attached to a pin 107 mounted on the head mounting plate 96. The tension spring 106 draws the slide 101 and the mounting plate 96 towards one another, the upper free end of the pin 102 abutting against a stop 108 on the mounting plate 96 when the slide button 100 is in its off-position, thereby defining the rest position of the mounting plate 96. When the slide 101 is moved upon actuation of the slide button 100, which is then set from its off-position to its on-position, the tension spring 106 transmits the actuating force to the mounting plate 97. Thus, the tension spring 106 forms part of an actuating device for transmitting the actuating movement to the mounting plate.

To hold the slide button 100 in its on-position the apparatus comprises a latching member 109 which is movable between a release position shown in FIG. 5 and a latching position shown in solid lines in FIG. 7. The member 109 is constructed as an L-shaped lever whose free end 110 cooperates with a lateral projection 111 of the actuating rod of the slide button 100, the free end 110 of the latching lever 109 being situated behind the projection 111 when the slide button is in its on-position in order to retain the button in its on-position against the force of the tension spring 103.

The latching lever 109 is pivotable about a spindle 112 and is coupled to a two-arm coupling lever 113, which is also pivotable about the spindle 112, by a tension spring 114 which is attached to the two levers, the latching lever 109 butting against an angular portion 115 of the coupling lever 113. At the end of the coupling lever 113 which is remote from the latching lever 109, the coupling lever carries a coupling pin 116 which cooperates with a coupling guide 117 formed by a bounding surface of a hole in the mounting plate 96, against which surface the coupling pin 116 is urged by a spring 118 which is attached to the coupling lever 113. In this way the latching lever 109 is coupled to the mounting plate 96. Via the coupling guide 117, the mounting plate 96, when it is set to its operating position, controls the movement of the latching lever 106 to its latching position, as will be described hereinafter.

The apparatus 87 has a control member 119 which is guided so as to be movable in a direction perpendicular to the bottom of the cassette holder 90 between a blocking position shown in FIGS. 5 and 6 and a release position shown in FIGS. 7 and 8. In this embodiment the control member 119 mechanically detects the presence of a magnetic-tape cassette 88 in the cassette holder 90. A sensing element 120 which is part of the control member 119 projects through an opening in the bottom of the cassette holder under the upward force of a compression spring 122. When the cassette holder does not contain a magnetic-tape cassette the sensing element 120 projects into the interior of the cassette holder 90, so that the control member 119 occupies its blocking position in which it inhibits selection of the "fast erase" mode. The blocking position of the control member 119 is defined by a stop 121 connected to the control member 119, which abuts against a guide 123 for the control member 119 under the influence of the compression spring 122. However, if the cassette holder 90 contains a magnetic-tape cassette 88, the cassette forces the control member 119 into its release position in which it allows the "fast erase" mode to be selected.

The control member 119 comprises a blocking portion 124 which is arranged to engage an edge 99 of the mounting plate. When the control member 119 is in its blocking position the blocking portion 124 is situated in the path of movement of the mounting plate 96 in the direction indicated by the arrow 95, so that the control member directly cooperates with the mounting plate and prevents an actuating movement from being transmitted to the mounting plate 96. As the latching lever 109 is coupled to the mounting plate 96 it also prevents the latching lever 109 from being set to its latching position. However, when the control member 119 has been set to its release position by a magnetic-tape cassette inserted into the cassette holder, the blocking portion 124 is no longer situated in the path of movement of the mounting plate 96. In this case the actuating device for the mounting plate 96, which device comprises the slide 101 and the tension spring 106, can transmit an actuating movement to the mounting plate 96. Therefore, when the control member 119 is in its release position the mounting plate 96 is set to its operating position by actuation of the slide button 100, and causes the latching lever 109 to be set to its latching position as result of the coupling between the mounting plate and this lever to retain the slide button 100 in its on-position. Thus, the slide button 100 is kept in its on-position by means of the latching lever 109 only when the mounting plate 96 has been set to its operating position; that is, when the "fast erase" mode has actually been started.

Fast-Erase Operation

For starting the "fast erase" mode the user of the apparatus slides the slide button 100 from its off-position to its on-position in the direction indicated by the arrow 95. This sliding movement is limited by, for example, a stop. As a result of the movement of the slide button the slide 101 is also slid in the direction indicated by the arrow 95 against the force exerted by the tension spring 103. Via the pin 102 the sliding movement of the slide 101 is also transmitted to the tension spring 106. If the control member 119 is in its blocking position because the cassette holder 90 does not contain a magnetic tape cassette 88, the blocking portion of the control member 119 locks the mounting plate 96 in its rest position, so that the tension spring 106 is further tensioned. Transmission of the actuating movement to the mounting plate 96 is interrupted and the pin 102 is lifted off the stop 108. Since the mounting plate 96 is locked in its rest position, the latching lever 109 is also retained in its release position via the coupling guide 117, the coupling pin 116, and the coupling lever 113.

If the user of the apparatus now releases the slide button 100, this button returns to its off-position under the influence of the tension spring 103 because the latching lever 109 is in its release position. The user of the apparatus therefore receives an indication that the "fast erase" mode selected by him has not been started. Indeed, this would servo no purpose since no cassette has been inserted in the apparatus, which is mechanically detected by the control member.

When the user has first inserted a magnetic-tape cassette 88 into the cassette holder 90, so that the control member 119 is in its release position when the slide button 100 is actuated, the sliding movement of the slide 102 is transmitted to the mounting plate 96 via the tension spring 106. The plate 96 is then set to its operating position in the direction indicated by the arrow 95, in which position its edge surface 99 abuts against the locating stops 97 and 98 and the pin 102 is lifted off the stop 108. In the operating position of the mounting plate 96, in order to erase the dictation signals recorded on the magnetic tape the magnetic erase head 94 contacts or approaches the magnetic tape, an erase-signal generator is connected to the erase head in a manner not shown, and the drive means is rendered operative to drive the winding spindle 92 with a higher speed. Thus, the "fast erase" mode has been started.

When the mounting plate 96 is set to its operating position the coupling lever 113 is pivoted into its operating position shown in FIG. 7 under the influence of the spring 118, the latching lever 109 abutting against a lateral projection 111 of the slide button 100, as shown in dash-dot lines in FIG. 7, as long as the slide button 100 has not yet reached its on-position, thereby tensioning the tension spring 114. When the slide button 100 reaches its on-position the free end 110 of the latching lever 109 snaps behind the projection 111 of the slide button under the influence of the spring 114, so that this slide button is kept in its on-position against the force of the tension spring 108. If the user of the apparatus now releases the slide button, this button is retained in its on-position, so that the user has an indication that the "fast erase" mode selected by the user has been started. As explained above, this indication is obtained only if the mounting plate is in its operating position; that is, the apparatus has actually been set to the "fast erase" mode.

The "fast erase" mode can be switched off by means of a switching device provided for this purpose, which may be for example a STOP button or an automatic shut-off device which is actuated upon detection of the end of the magnetic tape. The switching device cooperates with an actuating projection 125 of the mounting plate 96. When the switching device is actuated it exerts a force on the actuating projection 125, which force is directed oppositely to the direction indicated by the arrow 95, so that the mounting plate 96 is moved back to its rest position. The spring 118 then pulls the coupling pin 116 on the coupling lever 113 against the coupling guide 117, causing the coupling lever 113 to be pivoted and the projection 115 to reset the latching lever 109 to its release position. As a result of the slide button 100 is no longer retained in its on-position, so that it is reset to its off-position by the tension spring 103 moving the slide 101. Thus, all the apparatus parts are again in their rest positions, so that the previously operative "fast erase" mode is switched off.

Third Embodiment

Figure 9:
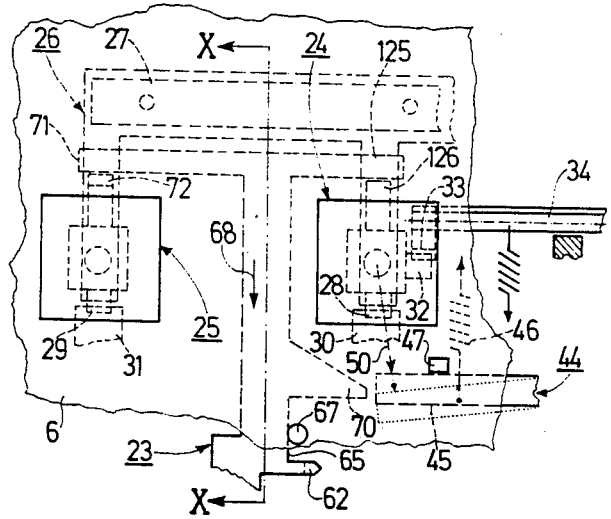
FIG. 9 is a view similar to that of FIG. 1, of a third embodiment which differs from the apparatus shown in FIGS. 1 to 4 in that the button for selecting the "recording" mode is already latched during the movement of the apparatus part for starting the "recording" mode, FIG. 10, in the same way as FIG. 2, is a sectional view taken on the line X—X in FIG. 9, showing the button for starting the "recording" mode.
Figure 10:
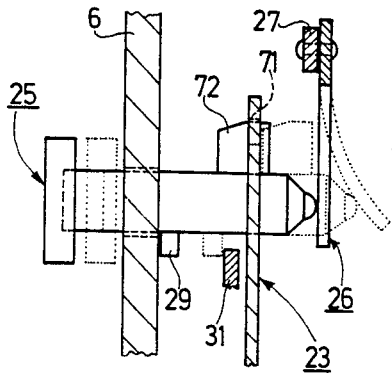
Figure 11:
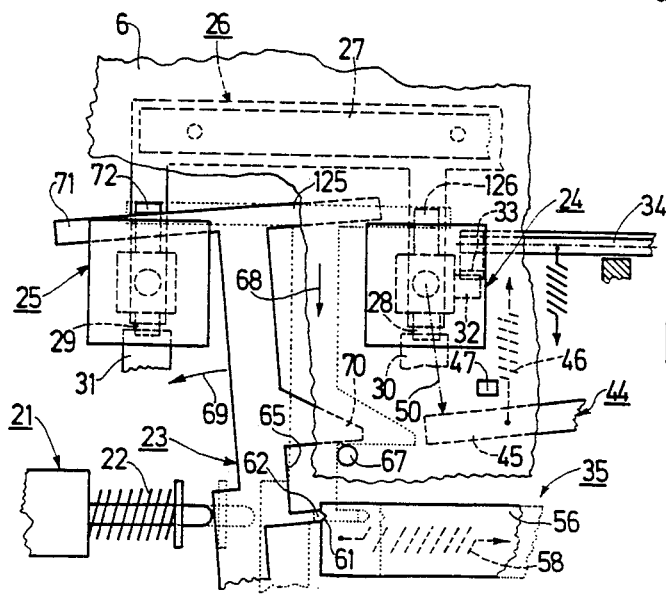
FIG. 11 shows the apparatus of FIG. 9 in a view similar to that of FIG. 4.

In the apparatus shown partly in FIGS. 9, 10 and 11 the first projection 72 of the push-button 25, which projection serves as a release device, has a different shape in comparison with that used in the apparatus shown in FIGS. 1 to 4. In this embodiment the bounding surface of the first projection 72 which cooperates with the shift lever 23 comprises an inclined first portion at the free end of this projection, adjoined by a second portion which extends up to the actuating rod in a direction perpendicular to the rod. Upon actuation of the push-button 25 the extension 71 of the shift lever 23 first slides over the inclined first portion of the bounding surface under the influence of the spring 66 and subsequently the extension 71 is slid parallel to the second portion of the bounding surface, so that the extension 71 of the shift lever 23, when set to its intermediate position shown in dotted lines in FIG. 11, now engages behind the first projection 72 of the push-button 25 in order to retain the button 25 in its on-position.

When the shift lever 23 is moved from its intermediate position to its operating position shown in solid lines in FIG. 11, the first projection 72 remains behind the extension 71. This enables a second projection 86 on the push-button 25 and a latching portion 85 on the shift lever 23 to be dispensed with. In this embodiment the extension 71 of the shift lever 23 also constitutes the latching portion for the push-button 25, which is moved to its latching position upon the movement of the shift lever from its rest position to its operating position. The extension 71 retains the push-button 25 in its on-position at an earlier instant than in the embodiment shown in FIGS. 1 and 4, namely when the shift lever 23 has substantially reached its intermediate position during its movement from its rest position to its operating position. Since the latching member constituted by the extension 71 has already been moved to its latching position when the shift lever 23 is set to its intermediate position, the push-button 25 is immediately retained in the on-position by means of the extension 71 when this position is reached, so that the push-button 25 is latched in its on-position even when it has been actuated briefly but fully.

When only the button 25 is actuated, the "recording" mode is not started because the servomechanism 35 which can be actuated by the other push-button 24 is not rendered operative. To prevent the push-button 25 from being latched by the extension 71 of the shift lever 23 when only that one button is depressed, the shift lever 23 in this modified apparatus has been provided with a further extension 125 which extends, transversely to the first actuating direction 78, up to the push-button 24. When the button 24 is not depressed, the extension 125 abuts a control portion 126 which projects from the push-button 24 in a direction opposite to the first actuating direction 68. This abutting prevents movement of the shift lever 23 in the first actuating direction 68 when the push-button 24 is in its off-position. When the push-button 24 is in its on-position, the portion 126 is clear of the extension 125, and permits the shift lever 23 to be moved in the first actuating direction 68. Thus, this control portion 126 of the push-button 24 constitutes a further control member which is movable between a release position and a blocking position, enabling the shift lever 23 to be moved and hence the "recording" mode to be started only when the button 24 has also been actuated. The control portion 126 also cooperates directly with the shift lever 23, so that an inadvertent movement of the shift lever out of its rest position is absolutely impossible when the control portion 126 is in its blocking position; that is, when the button 24 has not been actuated.

In this embodiment the button 25 is kept in its on-position only when the shift-lever 23 has actually been moved from its rest position to its operating position, which is the case only if this movement is allowed by the three control members 73, 74 and 126 which cooperate with the shift lever 23. Since the button 25 is retained in the on-position at an early instant, the user immediately has an indication that the "recording" mode has been started.

In this modified apparatus the reset of the shift lever to its rest position can also be initiated by actuation of the STOP button. In a manner not shown, this STOP actuation moves the shift lever 23 out of its operating position in a direction opposite to the first actuating direction 68, so that the extension 71 of the shift lever 23 liberates the first projection 72 of the push-button 25 and this button returns to its off-position, the shift lever 23 also being reset to its rest position and being retained in this position via its first projection 72 and the extension 71.

The three embodiments described above relate to magnetic-tape-cassette apparatuses in which signals are recorded or reproduced from a record carrier in the form of a tape. It is obvious that the invention may also be applied to other recording and/or reproducing apparatuses used in conjunction with record carriers in the form of sheets, endless belts, discs etc. In the case of an apparatus for a disc-shaped record carrier a control member for releasing or blocking a mode in which recorded information signals are reproduced may be constructed as a mechanical sensor for detecting the presence of a disc-shaped record carrier in the apparatus.

What is claimed is:

1. A mechanism for actuating an apparatus part, comprising
   at least one button arranged to be movable from an off-position to an on-position for selecting a mode of operation in the apparatus, and a return spring opposing movement of said button from said off-position to said on-position,
   at least one apparatus part,
   means for moving said part from a rest position to an operating position responsive to setting said button from its off-position to its on-position, said means for moving including an actuating device for moving said part to said on-position,
   means for starting said mode of operation responsive to said part being in its operating position,
   means for inhibiting said actuating device from moving said part to said on-position,
   a latching member, means for moving said member between a release position and a latching position, and means for latching said button in its on-position against the force of the return spring when said member is in its latching position, and
   at least one control member movable between a release position and a blocking position, in the blocking position said control member inhibiting movement of the latching member to its latching position, and causing said means for inhibiting to inhibit the transmission of actuating movement by the actuating device to said part,
   characterized in that said control member engages said apparatus part directly, and the latching member is mounted to the apparatus part for movement therewith, such that movement of the latching member into its latching position is controlled by the movement of the apparatus part to its operating position.

2. A mechanism as claimed in claim 1, characterized in that said part is arranged to be movable from said rest position to an intermediate position in a first actuating direction, and from said intermediate position to its operating position in a second actuating direction different from said first direction, said apparatus comprises a release device which cooperates with said part, and an actuating spring which urges said part in said first actuating direction from its rest position to its intermediate position, said release device enabling said apparatus part to be moved from said rest to said intermediate position in the first actuating direction upon movement of said button to its on-position, unless movement of the apparatus part to the intermediate position is blocked by the control member, said means for inhibiting is responsive to said part being in its rest position to inhibit transmission of the actuating movement to the part, and when said part is in said intermediate position said actuating device is enabled, for selective movement of the part from the intermediate position to its operating position in response to actuating movement of said device.

3. A mechanism as claimed in claim 2, characterized in that said latching member is formed as a portion of said apparatus part, and said button comprises a second projection projecting substantially in a direction opposite said second actuating direction of the apparatus part, arranged such that, when said button is in its on position and said part is in its operating position, the second projection extends behind said portion of the apparatus part for latching said button in its on-position.

4. A mechanism as claimed in claim 2, characterized in that said release device comprises a first projection, projecting from said button in a direction substantially opposite to said first actuating direction, and said part comprises an extension, extending substantially transversely to said first actuating direction, arranged such that in the off-position of the button said extension is urged against said first projection by said actuating spring; and upon setting said button to its on position, said first projection is moved out of engagement by said extension to enable said part to be moved by said spring to said intermediate position.

5. A mechanism as claimed in claim 4, characterized in that said latching member is formed as an integral extension of said apparatus part, in the on-position of the button said integral extension being disposed behind said first projection of said button when the apparatus part is in the intermediate position, for latching said button in its on-position.

6. A mechanism as claimed in claim 4, characterized in that said latching member is formed as a portion of said apparatus part, and said button comprises a second projection projecting substantially in a direction opposite said second actuating direction of the apparatus part, arranged such that, when said button is in its on position and said part is in its operating position, the second projection extends behind said portion of the apparatus part for latching said button in its on-position.

7. A mechanism for actuating an apparatus part, comprising at least one button arranged to be movable from an off-position to an on-position for selecting a mode of operation in the apparatus, and a return spring opposing movement of said button from said off-position to said on-position, at least one apparatus part, means for moving said part from a rest position to an operating position responsive to setting said button from its off-positin to its on-position, said means for moving including an actuating device for moving said part to said on-position, means for starting said mode of operation responsive to said part being in its operating position, means for inhibiting said actuating device from moving said part to said on-position, a latching member, means for moving said member between a release position and a latching position, and means for latching said button in its on-position against the force of the return spring when said member is in its latching position, and at least one control member movable between a release position and a blocking position, in the blocking position said control member inhibiting movement of the latching member to its latching position, and causing said means for inhibiting to inhibit the transmission of actuating movement by the actuating device to said part, characterized in that said apparatus part is arranged to be movable rectilinearly from its rest position to an intermediate position, and pivotally from said intermediate position to its operating position, said actuating device has an engaging portion movable along an actuation path in response to actuating movement of said device, said part has an engaging portion which is clear of said path when said part is in its rest position, and is disposed in said path when said part is in the intermediate position for engagement by the actuating device engaging portion during actuating movement of said device, for pivoting said part to its operating position, and said control member engages said apparatus part directly, and the latching member is mounted to the apparatus part for movement therewith, such that movement of the latching member into its latching position is controlled by the movement of the apparatus part to its operating position.

8. A recording and/or reproducing apparatus comprising a mechanism as claimed in claim 7, characterized in that said mode of operation is a recording mode, and said control member is movable to its blocking position in response to sensing of an anti-erase characteristic associated with a recording medium inserted in the apparatus.

9. An apparatus as claimed in claim 8, characterized in that the apparatus comprises a recording/playback switch, and in that said part is a switching lever which sets said switch to a recording position upon movement of said lever to its operation position.

10. A recording and/or reproducing apparatus comprising a mechanism for actuating an apparatus part, said mechanism including at least one button arranged to be movable from an off-position to an on-position for selecting a recording mode of operation in the apparatus, and a return spring opposing movement of said button from said off-position to said on-position, at least one apparatus part, means for moving said part from a rest position to an operating position responsive to setting said button from its off-position to its on-position, and means for starting said mode of operation responsive to said part being in its operating position, an actuating device for moving said part to said on-position, means for inhibiting said actuating device from moving said part to said on-position, a latching member, means for moving said member between a release position and a latching position, and means for latching said button in its on-position against the force of the return spring when said member is in its latching position, and at least one control member movable between a release position and a blocking position, in the blocking position said control member inhibiting movement of the latching member to its latching position, and causing said means for inhibiting to inhibit the transmission of actuating movement by the actuating device to said part, characterized in that said control member engages said apparatus part directly, and the latching member is mounted to the apparatus part for movement therewith, such that movement of the latching member into its latching position is controlled by the movement of the apparatus part to its operating position.

11. An apparatus as claimed in claim 10, characterized in that said part is arranged to be movable from said rest position to an intermediate position in a first actuating direction, and from said intermediate position to its operating position in a second actuating direction different from said first direction, said apparatus comprises a release device which cooperates with said part, and an actuating spring which urges said part in said first actuating direction from its rest position to its intermediate position, said release device enabling said apparatus part to be moved from said rest to said intermediate position in the first actuating direction upon movement of said button to its on-position, unless movement of the apparatus part to the intermediate position is blocked by the control member, said means for inhibiting is responsive to said part being in its rest position to inhibit transmission of the actuating movement to the part, and when said part is in said intermediate position said actuating device is enabled, for selective movement of the part from the intermediate position to its operating position in response to actuating movement of said device.

12. An apparatus as claimed in claim 11, characterized in that said latching member is formed as a portion of said apparatus part, and said button comprises a second projection projecting substantially in a direction opposite said second actuating direction of the apparatus part, arranged such that, when said button is in its on position and said part is in its operating position, the second projection extends behind said portion of the apparatus part for latching said button in its on-position.

13. An apparatus as claimed in claim 11, characterized in that said release device comprises a first projection, projecting from said button in a direction substantially opposite to said first actuating direction, and said part comprises an extension, extending substantially transversely to said first actuating direction, arranged such that in the off-position of the button said extension is urged against said first projection by said actuating spring; and upon setting said button to its on position, said first projection is moved out of engagement by said extension to enable said part to be moved by said spring to said intermediate position.

14. An apparatus as claimed in claim 13, characterized in that said latching member is formed as an integral extension of said apparatus part, in the on-position of the button said integral extension being disposed behind said first projection of said button when the apparatus part is in the intermediate position, for latching said button in its on-position.

15. An apparatus as claimed in claim 13, characterized in that said latching member is formed as a portion of said apparatus part, and said button comprises a second projection projecting substantially in a direction opposite said second actuating direction of the apparatus part, arranged such that, when said button is in its on position and said part is in its operating position, the second projection extends behind said portion of the apparatus part for latching said button in its on-position.

* * * * *